D. W. GARST.
Improvement in Car Starters.
No. 133,218.  Patented Nov. 19, 1872.
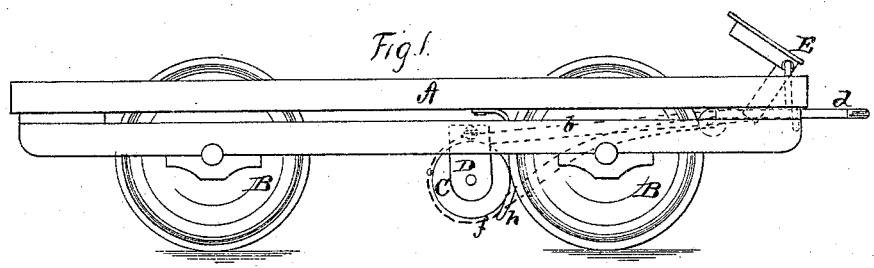
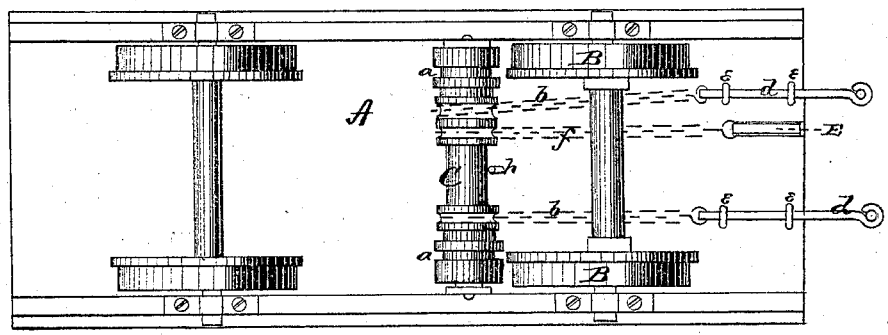
Witnesses:
James E. Hutchinson
C. L. Evert
Inventor
David W. Garst

UNITED STATES PATENT OFFICE.

DAVID W. GARST, OF WASHINGTON, DISTRICT OF COLUMBIA.

IMPROVEMENT IN CAR-STARTERS.

Specification forming part of Letters Patent No. 133,218, dated November 19, 1872; antedated November 18, 1872.

*To all whom it may concern:*

Be it known that I, DAVID W. GARST, of Washington, in the county of Washington and in the District of Columbia, have invented certain new and useful Improvements in Starting Cars; and do hereby declare that the following is a full, clear, and exact description thereof, reference being had to the accompanying drawing and to the letters of reference marked thereon making part of this specification.

The nature of my invention consists in the construction and arrangement of a "car-starter," as will be hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 a bottom view, of a car-truck with my starter attached thereto.

A represents the bottom of a street-railroad car, and B B the wheels supporting the same. Behind one or both sets of wheels is situated a roller, C, the pivots of which are placed in hangers D D pivoted to the truck-frame. The ends of the roller C are grooved circumferentially so as to fit the wheels, the flanges of the wheels entering said grooves $a\,a$. Two chains, $b\,b$, are attached to the roller and are wound around the same, so as to pass from the under side forward over the axle, and their front ends are attached to rods $d\,d$, confined by staples $e\,e$ to the under side of the bottom A. To the front ends of these rods $d\,d$ the horse is attached for pulling the car. Another chain, $f$, is also attached to the roller C and wound around the same so as to pass from the upper side forward over the axle, and its front end is attached to the lower end of an L-shaped lever, E, pivoted in a slot in the platform of the car. The upper end of this lever is provided with a suitable foot-piece for the driver to put his foot upon.

The car being at a stand-still, and it is desired to start it, the driver will press down upon the foot-lever E, which, in connection with the pulling of the horse on the rods $d\,d$, throws the roller C against the wheels, and, the roller turning by the unwinding of the chains $b\,b$, the friction causes the wheels to turn forward, starting the car. As soon as the car is started the driver removes his foot from the foot-lever, when a spring, $h$, will at once throw the roller C away from the wheels so as not to rub against the same, and the eyes on the rear ends of the rods $d\,d$ coming against the rear staples $e\,e$ allow the horse to pull the car along without any strain upon the roller.

Having thus fully described my invention, what I claim as new, and desire to secure by Letters Patent, is—

1. In a street-car starter, a movable friction-roller placed under the bed of the car and connected by chains or other devices to the horses, and the amount of friction on the wheels controlled by means of a foot-lever on the platform to be operated by the driver, substantially as herein set forth.

2. The combination of the circumferentially-grooved swinging roller C, chains $b\,b$, draft-rods $d\,d$, chain $f$, and foot-lever E, all constructed and arranged substantially as and for the purposes herein set forth.

3. In combination with the swinging roller C and its chains as described, the spring $h$ for throwing the same away from the wheels, substantially as herein set forth.

In testimony that I claim the foregoing I have hereunto set my hand this 4th day of December, 1871.

D. W. GARST.

Witnesses:
  A. N. MARR,
  EDM. F. BROWN.